(12) United States Patent
Chen et al.

(10) Patent No.: US 11,648,783 B2
(45) Date of Patent: May 16, 2023

(54) PORTABLE LABEL PRINTER

(71) Applicant: TSC AUTO ID TECHNOLOGY CO., LTD., New Taipei (TW)

(72) Inventors: Ko-Chun Chen, New Taipei (TW); Jung-Te Cheng, New Taipei (TW); Hui-Tse Chang, New Taipei (TW); Wen-Wei Tsai, New Taipei (TW)

(73) Assignee: TSC AUTO ID TECHNOLOGY CO., LTD., New Taipei (TW)

( * ) Notice: Subject to any disclaimer, the term of this patent is extended or adjusted under 35 U.S.C. 154(b) by 199 days.

(21) Appl. No.: 17/153,979

(22) Filed: Jan. 21, 2021

(65) Prior Publication Data

US 2022/0063296 A1 Mar. 3, 2022

(30) Foreign Application Priority Data

Sep. 1, 2020 (TW) .................................. 109211415

(51) Int. Cl.
*B41J 3/50* (2006.01)
*B41J 3/36* (2006.01)
*B41J 3/407* (2006.01)
*B41J 3/46* (2006.01)

(52) U.S. Cl.
CPC . *B41J 3/50* (2013.01); *B41J 3/36* (2013.01); *B41J 3/4075* (2013.01); *B41J 3/46* (2013.01)

(58) Field of Classification Search
CPC ......... B41J 3/36; B41J 3/50; B41J 3/46; B41J 3/4075; B65C 9/00; B65C 11/0289; B65C 2009/0003; G06K 1/121; G06K 15/02; G06K 15/021; G06K 15/024
See application file for complete search history.

(56) References Cited

U.S. PATENT DOCUMENTS

| 6,409,401 | B1* | 6/2002 | Petteruti | G07B 1/00 400/70 |
| 7,931,205 | B2 | 4/2011 | Blanchard, Jr. et al. | |
| 8,342,763 | B2 | 1/2013 | Vo et al. | |
| 2006/0071063 | A1* | 4/2006 | Duckett | G06K 17/0025 400/23 |
| 2018/0357452 | A1 | 12/2018 | Duckett et al. | |
| 2020/0290369 | A1* | 9/2020 | Mizutani | B41J 32/00 |

* cited by examiner

*Primary Examiner* — Christopher E Mahoney
*Assistant Examiner* — Marissa Ferguson-Samreth
(74) *Attorney, Agent, or Firm* — Li & Cai Intellectual Property (USA) Office

(57) ABSTRACT

A portable label printer for printing content onto a surface of a label is provided. The label has a chip disposed therein. The portable label printer includes a main body, an RFID antenna assembly, a front cover unit, a back cover unit, and a print head module. The front and back cover units are disposed in the main body, and a paper exit port is formed between the front and back cover units. The RFID antenna assembly is disposed in the main body and adjacent to the paper exit port. The print head module is disposed in the main body and under the RFID antenna assembly. The label first passes through the print head module, and then passes through the RFID antenna assembly. When the label passes through the RFID antenna assembly, the RFID antenna assembly performs data reading or data writing on the chip of the label.

10 Claims, 13 Drawing Sheets

PORTABLE LABEL PRINTER

CROSS-REFERENCE TO RELATED PATENT APPLICATION

This application claims the benefit of priority to Taiwan Patent Application No. 109211415, filed on Sep. 1, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a label printer, and more particularly to a portable label printer.

BACKGROUND OF THE DISCLOSURE

With the rapid development of the logistics industry, there has been an increased use of labels that have chips disposed therein by logistics companies in recent years. Such labels allow relevant personnel to write specific data (e.g., product information) on the chip of the label. When the relevant personnel receives a product, the data stored in the chip of the label can be instantly read through related radio frequency identification (RFID) devices, so that the relevant personnel can quickly learn of the information corresponding to the product that is attached with the label. Even when the content printed on a surface of the label is not clearly discernible, the relevant personnel can still easily gain access to content that is stored in the chip of the label.

Generally, such labels are used in the following manner. Firstly, a conventional label printer is used to print relevant product information onto the label, and then an RFID writing device independent from the label printer is used to write the relevant data on the chip of the label that has already been printed with a specific content. However, this manner of operation can give rise to problems such as being time consuming and prone to error.

SUMMARY OF THE DISCLOSURE

In response to the above-referenced technical inadequacies, the present disclosure provides a portable label printer. The portable label printer mainly reduces inconveniences for personnel using labels with chips disposed therein, an operation of which requires using a label printer and then an RFID writing device to complete label production.

In one aspect, the present disclosure provides a portable label printer used for printing a content onto a surface of a label that has a chip disposed therein. The portable label printer includes a main body, at least one RFID antenna assembly, a front cover unit, a back cover unit, and a print head module. The main body includes a processing module and an RFID processing module. The processing module is electrically connected to the RFID processing module, and the main body includes a paper roll compartment. The RFID antenna assembly is electrically connected to the RFID processing module, and performs data reading and data writing on the chip of the label. The front cover unit is disposed at a front end of the main body, and includes an insulating front cover and an insulating limiting assembly. An inner side of the insulating front cover has a first limiting structure, and the insulating limiting assembly has a second limiting structure. The insulating limiting assembly is detachably disposed at the inner side of the insulating front cover, and the RFID antenna assembly is fixedly disposed at the inner side of the insulating front cover by cooperation of the first limiting structure and the second limiting structure. The back cover unit is movably disposed at a back end of the main body, and a paper exit port is formed between the front cover unit and the back cover unit. The print head module is disposed in the main body and adjacent to the paper roll compartment. The print head module prints the content onto the surface of the label, and the RFID antenna assembly is disposed in closer proximity to the paper exit port than the print head module. The print head module first prints the content onto the surface of the label, and then the processing module controls the RFID processing module to perform data reading and data writing on the chip of the label.

Therefore, after printing a specific content onto the surface of the label, the portable label printer of the present disclosure is capable of directly writing the specific content on the chip of the label by utilizing the RFID antenna assembly.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
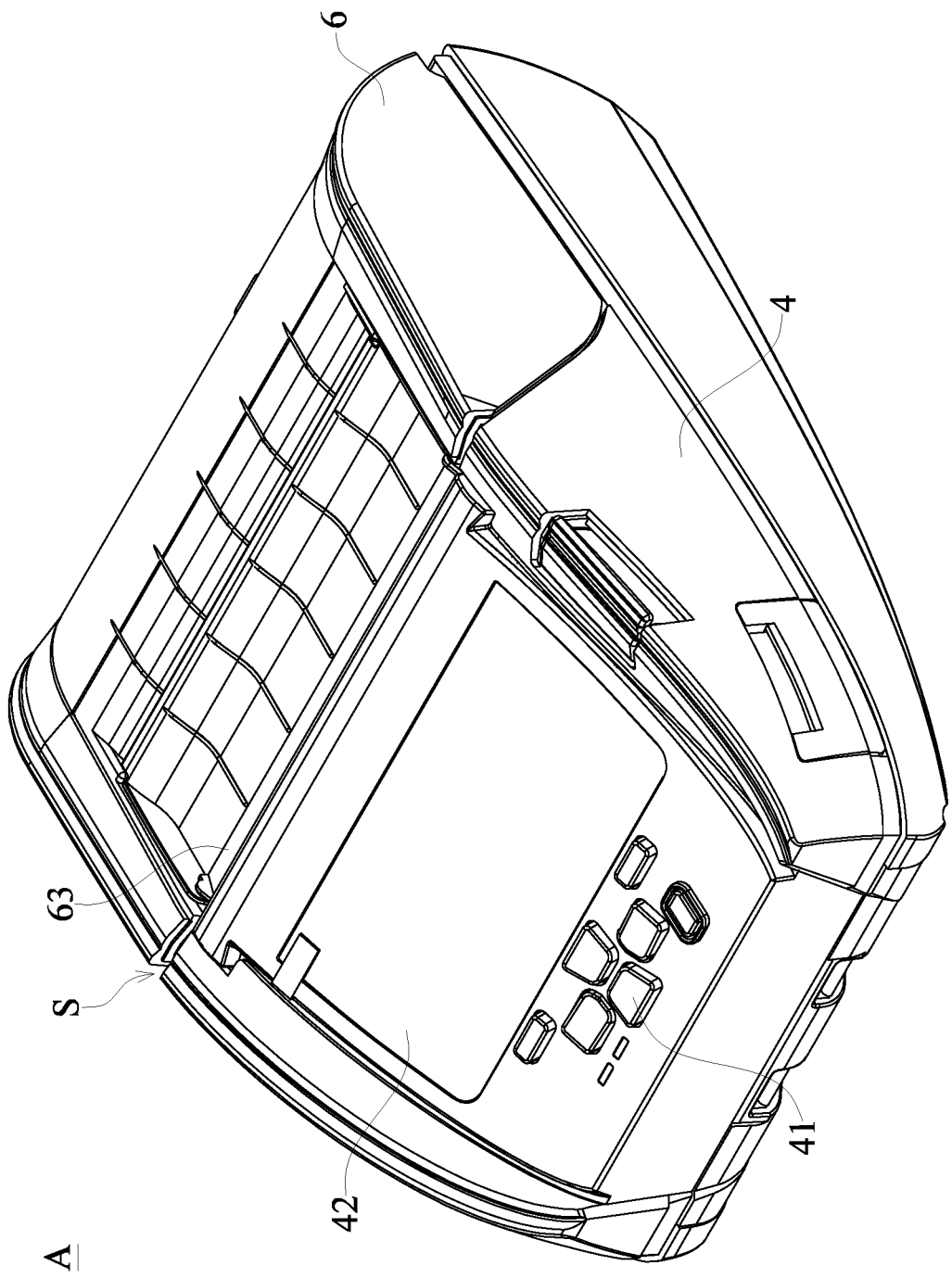
FIG. 1 and FIG. 2 are schematic views showing a portable label printer from two different perspectives according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the following description, if it is indicated that "reference is made to a specific figure" or "as shown in a specific figure", this is only to emphasize that in the description that follows, most content related thereto appears in said specific figure. However, the description that follows should not be construed as being limited to said specific figure only.

Figure 2:
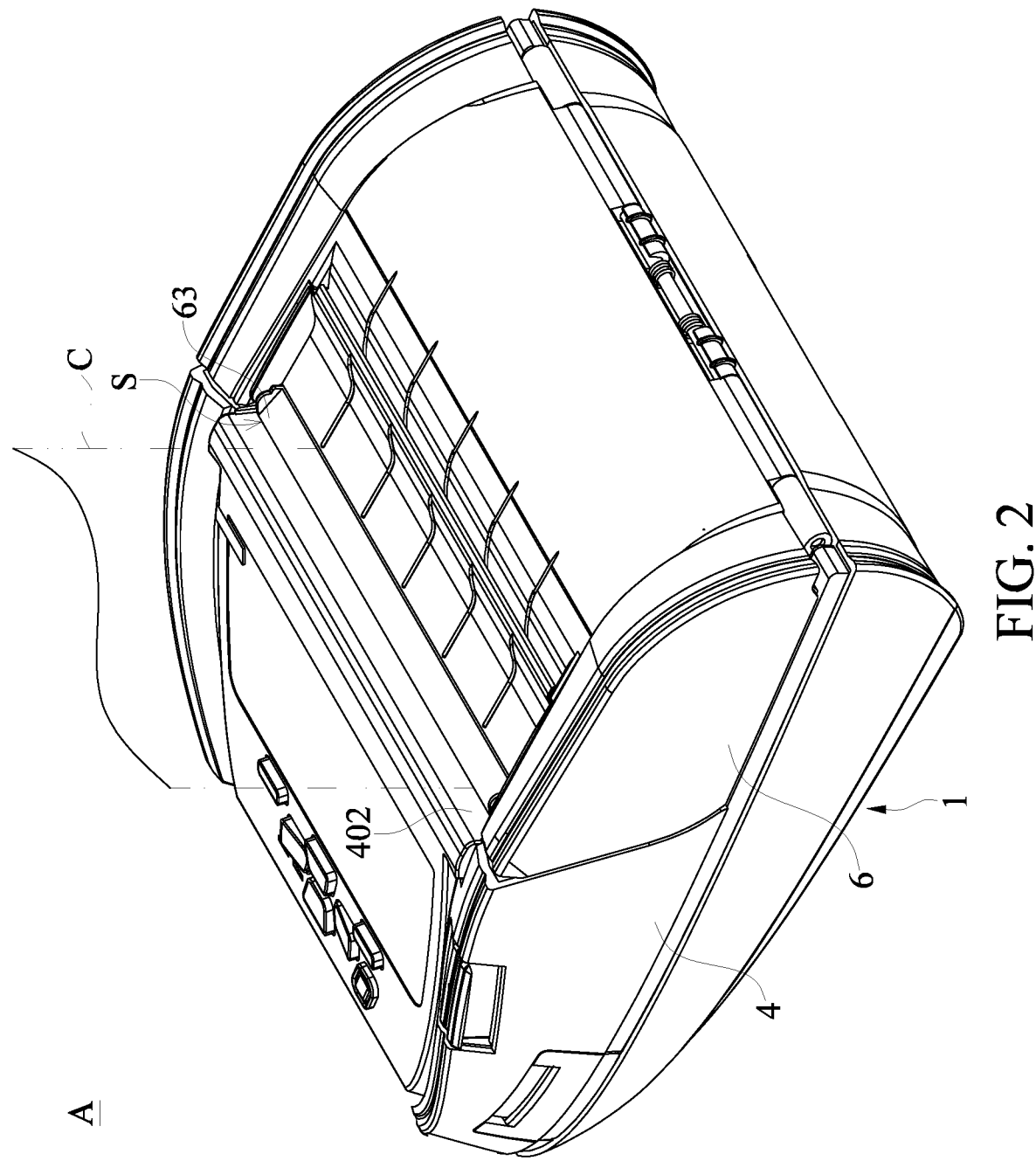
Figure 3:
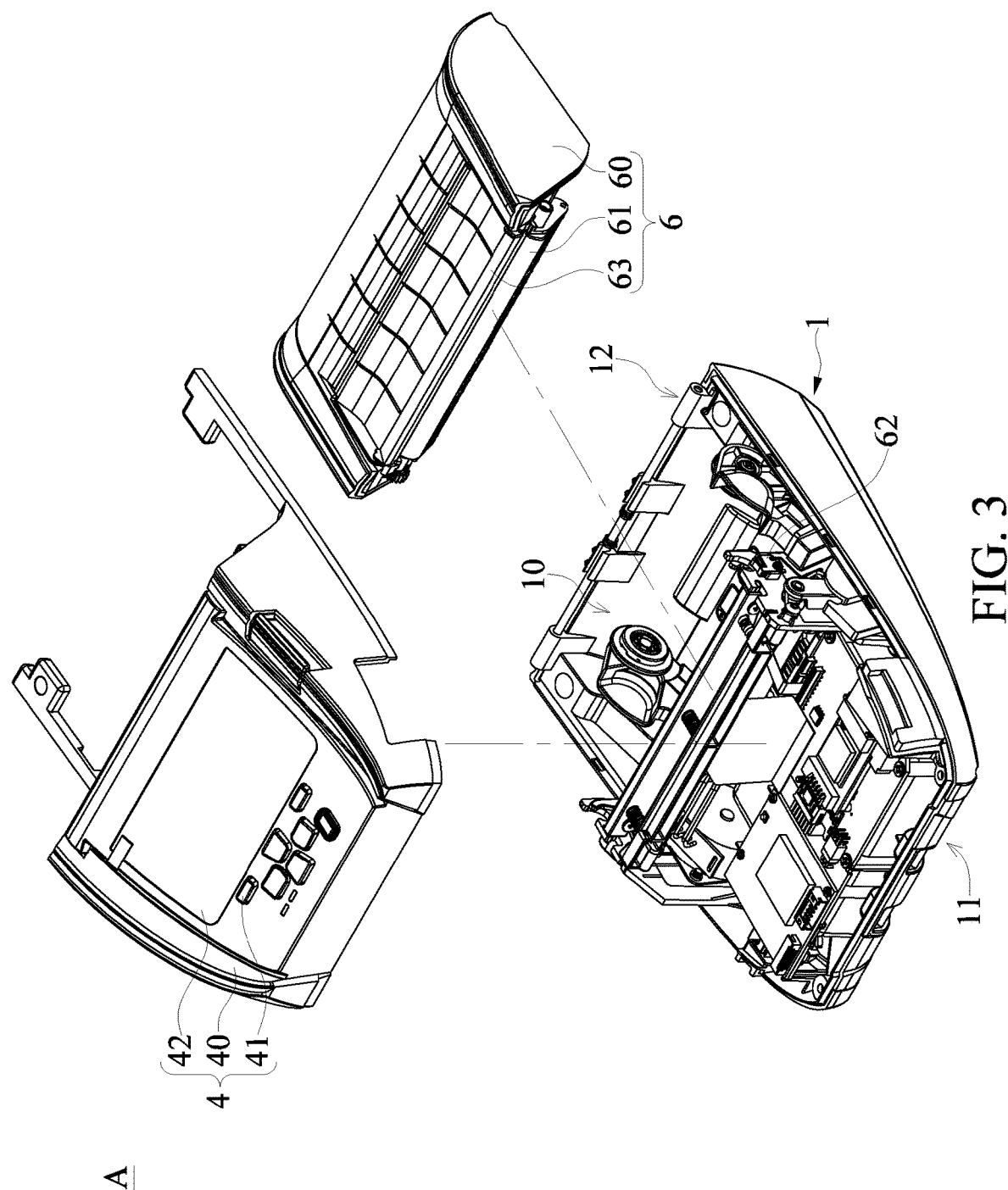
FIG. 3 is an exploded view of a main body, a front cover unit, and a back cover unit of the portable label printer according to the present disclosure.
Figure 4:
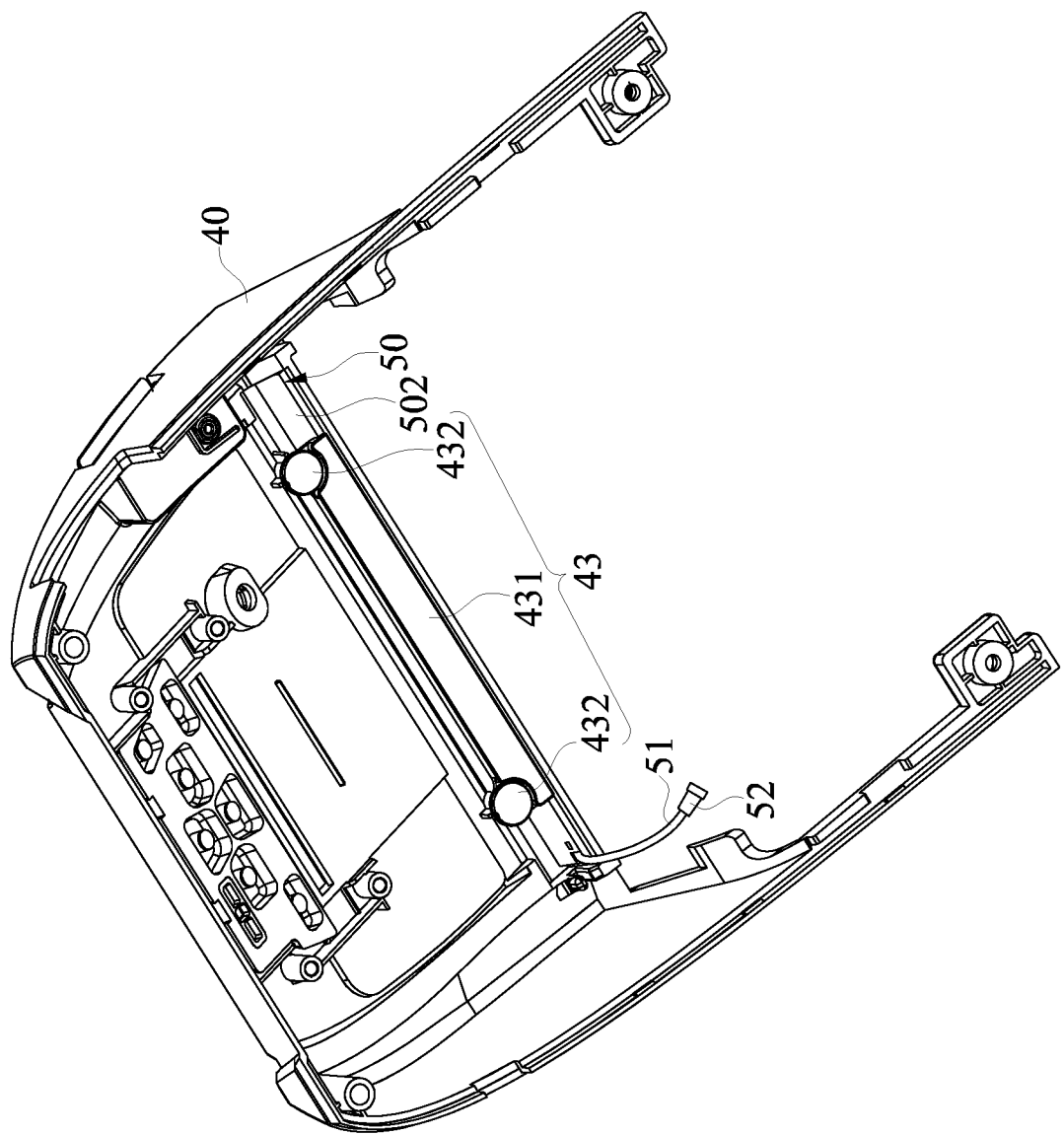
FIG. 4 is a schematic view of the front cover unit of the portable label printer according to the present disclosure.
Figure 5:
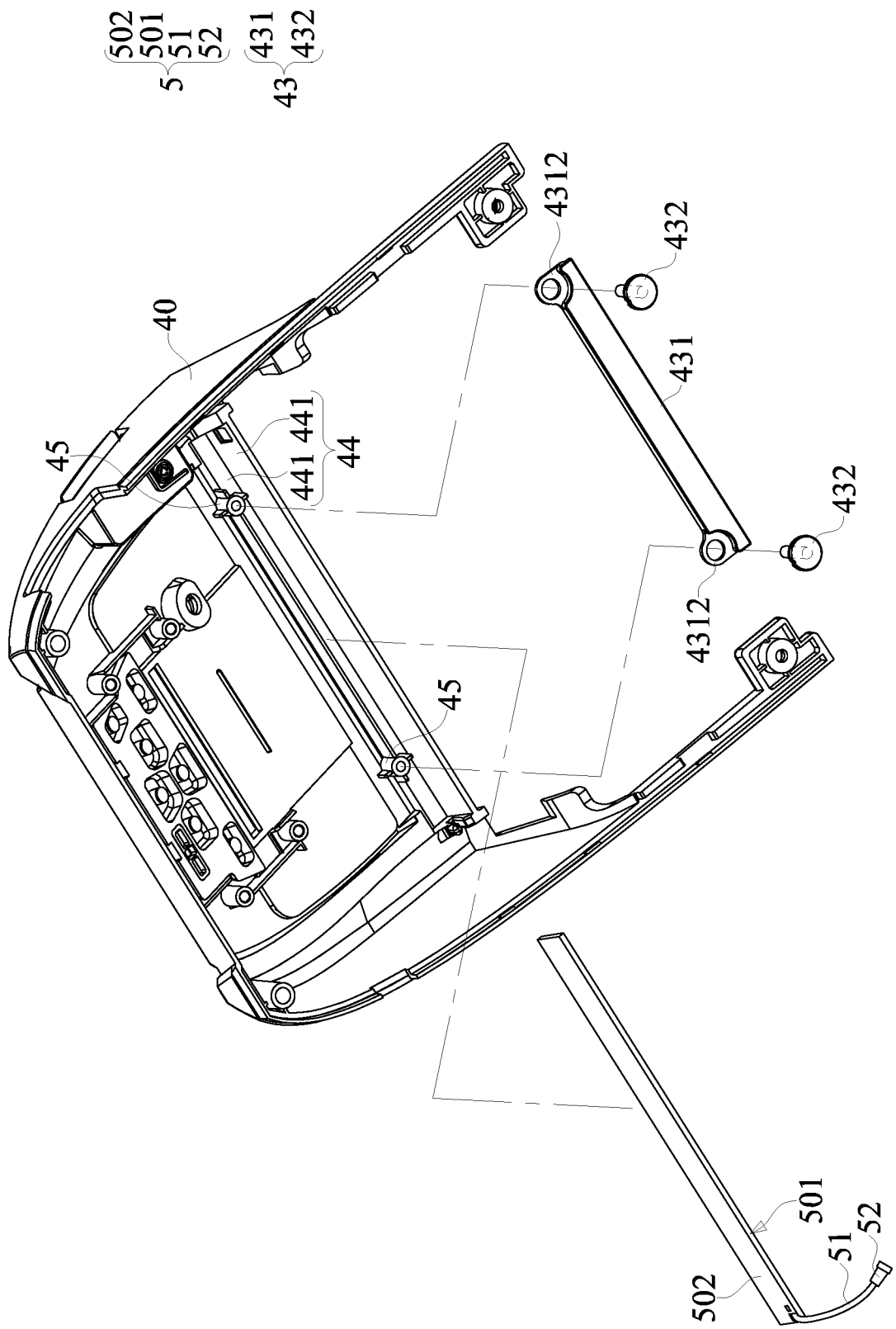
FIG. 5 is a partial exploded view of the front cover unit and an RFID antenna assembly of the portable label printer according to the present disclosure.
Figure 7:
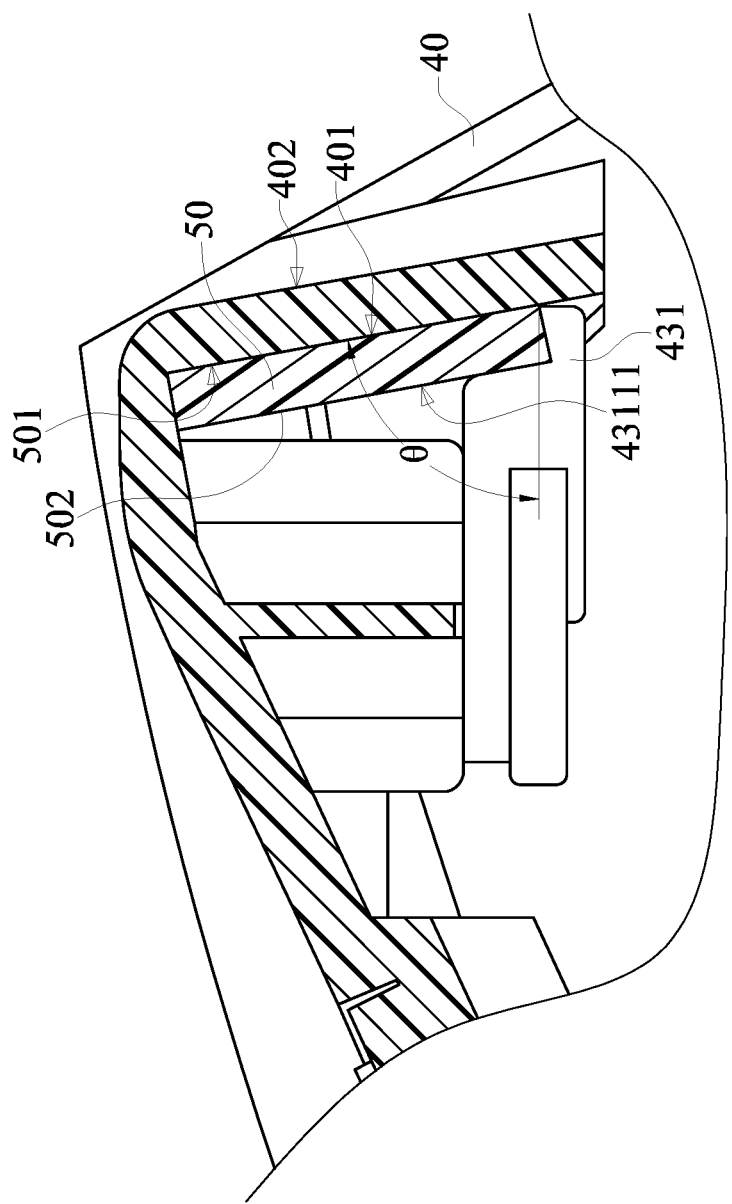
FIG. 7 is a partial sectional side view of the front cover unit and the RFID antenna assembly of the portable label printer according to the present disclosure.

Reference is made to FIG. 1 to FIG. 5, which are to be read in conjunction with FIG. 7. FIG. 1 and FIG. 2 are schematic views showing a portable label printer from two different perspectives according to the present disclosure. FIG. 3 is a schematic view showing a back cover unit of the portable label printer after being operated according to the present disclosure. FIG. 4 is a schematic view of a front cover unit of the portable label printer according to the present disclosure. FIG. 5 is a partial exploded view of the front cover unit and an RFID antenna assembly of the portable label printer according to the present disclosure. FIG. 7 is a sectional side view of the front cover unit and the RFID antenna assembly of the portable label printer according to the present disclosure.

Figure 12:
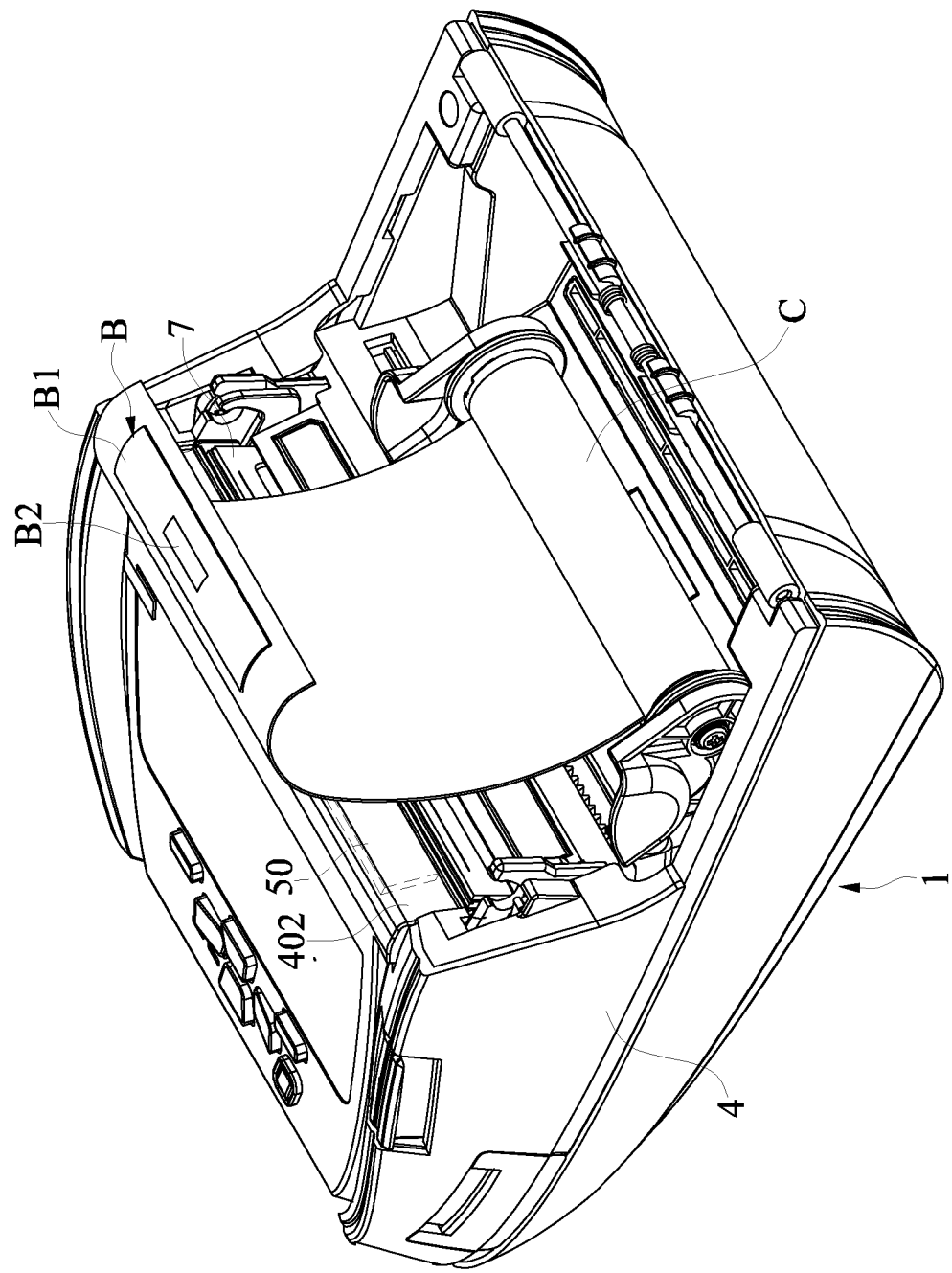
FIG. 12 is a schematic view showing the portable label printer being without the back cover unit and having a label disposed therein according to the present disclosure.

A portable label printer A of the present disclosure is used for printing a content onto a surface B1 (as shown in FIG. 12) of a label B (as shown in FIG. 12). The label B (as shown in FIG. 12) has a chip B2 (as shown in FIG. 12) disposed therein. It should be noted that the portable label printer A of the present disclosure can be carried around by a user, and the user can have contents (e.g., specific texts and pictures) printed onto the label B through the portable label printer A of the present disclosure. The portable label printer A of the present disclosure not only can print a specific content on the label B, but is also capable of writing data on the chip B2 of the label B via radio frequency identification (RFID) technology. That is to say, through other devices, relevant personnel can read the data stored in the chip B2 of the label B that is printed out by the portable label printer A of the present disclosure.

The portable label printer A of the present disclosure includes: a main body 1, a processing module 2, an RFID processing module 3, a front cover unit 4, an RFID antenna assembly 5 (as shown in FIG. 5), a back cover unit 6, and a print head module 7. The main body 1 is a component that constitutes an overall external appearance of the portable label printer A. Further, the main body 1 includes all basic components (e.g., a battery, an outer casing, a paper feeding mechanism, and a paper ejection mechanism) of a conventional portable label printer, which will not be reiterated herein. The main body 1 includes a paper roll compartment 10 that is used for installing a label paper roll C (as shown in FIG. 12). The processing module 2 is disposed in the main body 1, and the processing module 2 controls overall actions (such as printing, correcting, etc.) of the portable label printer A. The processing module 2 includes, for example, a main circuit board 20 and at least one processor 21.

Figure 10:
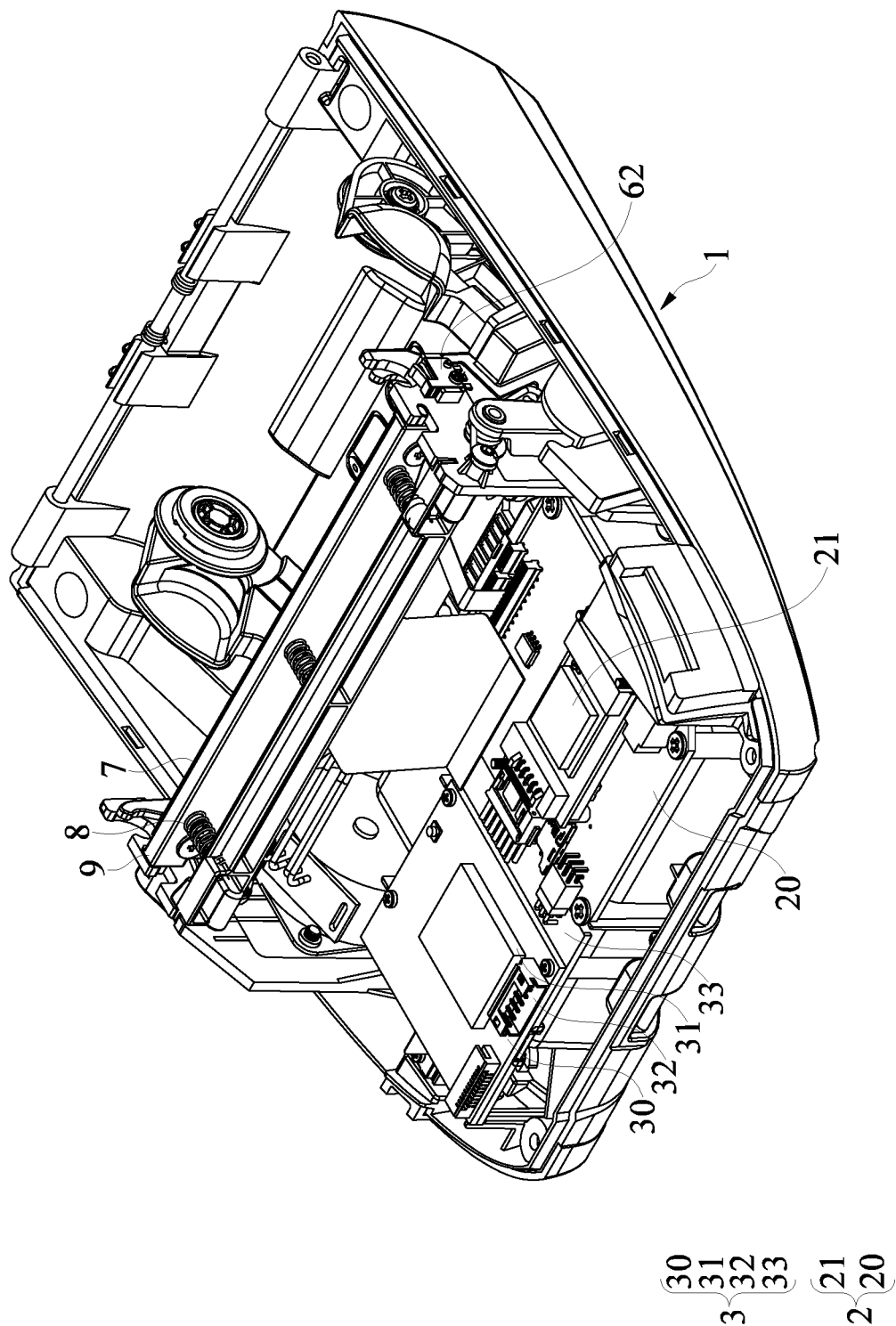

As shown in FIG. 3 and FIG. 10 (which is a schematic view showing the portable label printer being without the front cover unit and the back cover unit according to the present disclosure), the RFID processing module 3 includes a circuit board 30, an RFID processor 31, a socket 32, and a voltage adapter board 33. The circuit board 30 of the RFID processing module 3 is disposed in the main body 1, the RFID processor 31 is fixedly disposed on the circuit board 30, and the socket 32 is fixedly disposed on the circuit board 30. The RFID processor 31 controls the RFID antenna assembly 5 (as shown in FIG. 5), such that the RFID antenna assembly 5 performs data writing or data reading on the chip B2 of the label B. The voltage adapter board 33 is connected to the circuit board 30 of the RFID processing module 3 and the main circuit board 20 of the processing module 2. The voltage adapter board 33 converts power supplied by a battery through the processing module 2 into a voltage that is required for operation of the RFID processor 31. In different embodiments, the processor 21 of the processing module 2 and the RFID processor 31 can be integrated as a single processor.

As shown in FIG. 3, the front cover unit 4 includes an insulating front cover 40, and the insulating front cover 40 is detachably fixed at a front end 11 of the main body 1. The front cover unit 4 mainly shields the processing module 2 and the RFID processing module 3 disposed in the main body 1, and the front cover unit 4 can further include a plurality of operation buttons 41 and a display screen 42. The operation buttons 41 and the display screen 42 are disposed on the insulating front cover 40. The back cover unit 6 is detachably fixed at a back end 12 of the main body 1. The back cover unit 6 mainly shields the paper roll compartment 10, and can be operated to rotate relative to the main body 1 so as to expose the paper roll compartment 10.

Figure 6:
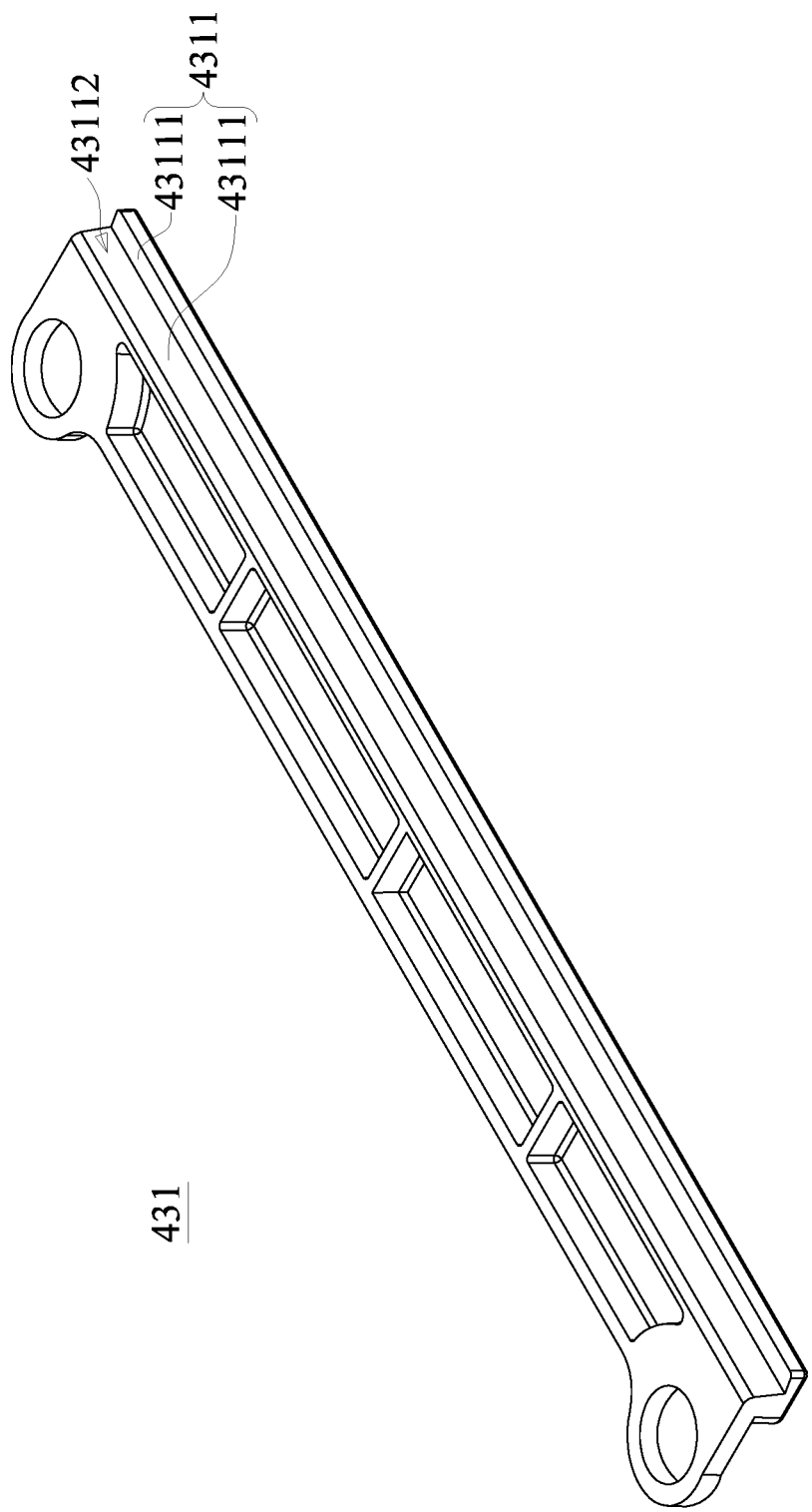
FIG. 6 is a schematic view of an insulating bottom plate of the portable label printer according to the present disclosure.

As shown in FIG. 4 to FIG. 6, the front cover unit 4 further includes an insulating limiting assembly 43. An inner side of the insulating front cover 40 has a first limiting structure 44. The first limiting structure 44 includes, for example, two side walls 441, and an L-shaped receptacle is formed by cooperation of the two side walls 441. The insulating front cover 40 further includes a plurality of first fixing structures 45, and the first fixing structures 45 are disposed adjacent to the first limiting structure 44. For example, each of the first fixing structures 45 has a fixing hole.

The insulating limiting assembly 43 is detachably fixed at the inner side of the insulating front cover 40, and the insulating limiting assembly 43 includes an insulating bottom plate 431 (as shown in FIG. 6) and a plurality of insulating fixing members 432. The insulating bottom plate 431 includes a second limiting structure 4311 and two second fixing structures 4312. Referring to FIG. 6, a schematic view of the insulating bottom plate 431 is shown. In practice, the second limiting structure 4311 can include, for example, two side walls 43111. An end of each of the two side walls 43111 is connected with each other, jointly forming a structure having a shape similar to that of the letter "L". Further, an L-shaped receptacle is cooperatively formed by the two side walls 43111. The two second fixing structures 4312 are connected to one of the side walls 43111, and each of the second fixing structures 4312 has, for example, a fixing hole.

The insulating bottom plate 431 and the insulating front cover 40 are fixed with each other by cooperation of the plurality of insulating fixing members 432, the plurality of first fixing structures 45, and the plurality of second fixing structures 4312. Specifically, the insulating fixing members 432 can be plastic plugs that are shaped similar to screws, and the first fixing structures 45 and the second fixing structures 4312 each have holes of substantially the same size. A part of the plastic plug can be simultaneously inserted into the fixing holes of the first fixing structures 45 and the second fixing structures 4312. It should be noted that the insulating bottom plate 431 and each of the insulating fixing members 432 are not made of metallic materials. Therefore, the insulating bottom plate 431 and each of the insulating fixing members 432 would not interfere with the operation of the RFID antenna assembly 5.

As shown in FIG. 4 to FIG. 6 and FIG. 10, the RFID antenna assembly 5 includes an antenna substrate 50, an electrical connection wire 51, and an electrical connection plug 52. An antenna structure (not shown in the figures) is formed on a surface 501 of the antenna substrate 50. One end of the electrical connection wire 51 is fixed to the antenna substrate 50, and the electrical connection plug 52 is disposed at another end of the electrical connection wire 51. The electrical connection plug 52 is pluggably inserted into the socket 32 of the circuit board 30 of the RFID processing module 3. The RFID antenna assembly 5 is electrically connected to the RFID processing module 3, and the RFID antenna assembly 5 performs data writing or data reading on the chip B2 (as shown in FIG. 12) of the label B (as shown in FIG. 12). In practice, the main body 1 includes a paper feeding mechanism (not shown in the figures), a paper ejection mechanism (not shown in the figures), and a corresponding power source. The processing module 2 controls the actuation of the power source, the paper feeding mechanism, and the RFID antenna assembly 5, so as to print a content on the surface B1 (as shown in FIG. 12) of the label B (as shown in FIG. 12) and write specific data on the chip B2 of the label B. Then, the processing module 2 controls the power source, the paper ejection mechanism, and the RFID antenna assembly 5, such that the label B moves backward. Accordingly, the RFID antenna assembly 5 reads the data stored in the chip B2 of the label B so as to confirm whether the data that was just written thereon can be read correctly. That is to say, in one embodiment, the label B (as shown in FIG. 12) is firstly outputted in a direction away from the main body 1, so that a content is printed thereon and data is written on the chip B2 (as shown in FIG. 12). Then, the label B (as shown in FIG. 12) returns in a direction toward the main body 1, so that the RFID antenna assembly 5 can read the data in the chip B2 (as shown in FIG. 12) so as to confirm whether the data that was just written thereon can be read correctly.

In different embodiments, according to a size of the RFID antenna assembly 5 and an external appearance, a size, etc., of the antenna structure, after the RFID processing module 3 controls the RFID antenna assembly 5 to write specific data on the chip B2 of the label B, the RFID processing module 3 can transmit corresponding information to the processing module 2. The processing module 2 is capable of controlling related mechanisms correspondingly, such that the label B can be temporarily stopped from leaving the main body 1 or have its movement speed slowed down. In this way, the RFID antenna assembly 5 can read the data in the chip B2 of the label B and proceed with authentication. In a different embodiment, after the RFID antenna assembly 5 writes the data on the chip B2 (as shown in FIG. 12) of the label B (as shown in FIG. 12), the RFID antenna assembly 5 can also immediately read the data in the chip B2 for authentication purposes.

For special applications, the portable label printer A of the present disclosure can also allow partial data prestored in the chip B2 of each label B to be printed onto the label B. Specifically, the processing module 2 can first keep the print head module 7 from actuation, so that the chip B2 of the label B moves to where the RFID antenna assembly 5 is positioned, and the RFID antenna assembly 5 may read the data prestored in the chip B2 of the label B. Then, the processing module 2 makes the label B return to a position where it can be printed on by the print head module 7. Lastly, the processing module 2 obtains the data prestored in the chip B2 of the label B via the RFID processing module 3, and controls the print head module 7 to print such data onto the label B.

Referring to FIG. 7, a partial sectional side view of the front cover unit 4 and the RFID antenna assembly 5 is shown. In a preferred embodiment, an included angle θ between the surface 501 of the antenna substrate 50 that has the antenna structure formed thereon and a horizontal plane ranges from 65 to 90 degrees. In this way, the antenna structure on the antenna substrate 50 can better perform data writing and data reading on the chip B2 of the label B.

As shown in FIG. 5 to FIG. 7, in a preferred embodiment, the insulating front cover 40 has a first inclined abutment surface 401 formed inside thereof, the second limiting structure 4311 has a second inclined abutment surface 43112, and the first inclined abutment surface 401 and the second inclined abutment surface 43112 are parallel to each other. The surface 501 of the antenna substrate 50 that has the antenna structure formed thereon abuts against the first inclined abutment surface 401, and another surface 502 of the antenna substrate 50 abuts against the second inclined abutment surface 43112. That is to say, when the antenna substrate 50 is fixed by the insulating limiting assembly 43 at the inner side of the insulating front cover 40, two surfaces 501, 502 of the antenna substrate that are opposite to each other would correspondingly abut against the first inclined abutment surface 401 and the second inclined abutment surface 43112, while the antenna substrate 50 is stably disposed at the inner side of the insulating front cover 40. Since the portable label printer A of the present disclosure is likely to be used under different conditions (e.g., being carried at the waist of the user), compared with a desktop label printer, the portable label printer A is more likely to experience jolts and shudders. Therefore, the abovementioned configuration can significantly enhance the stability of the antenna substrate 50 being fixed to the insulating front cover 40, and further ensure that the antenna structure is maintained at a relatively better position for reading and writing of the label B.

Reference is again made to FIG. 1 to FIG. 3. The back cover unit 6 is movably disposed in the main body 1. When the front cover unit 4 and the back cover unit 6 are both fixedly disposed in the main body 1, a paper exit port S is formed between the front cover unit 4 and the back cover unit 6. The label B is outputted from the paper exit port S. It is worth mentioning that the RFID antenna assembly 5 is disposed adjacent to the paper exit port S. When each label B passes through the paper exit port S in a direction away from the main body 1, the RFID antenna assembly 5 performs actions including data writing and data reading on the chip B2 of the label B.

Figure 8:
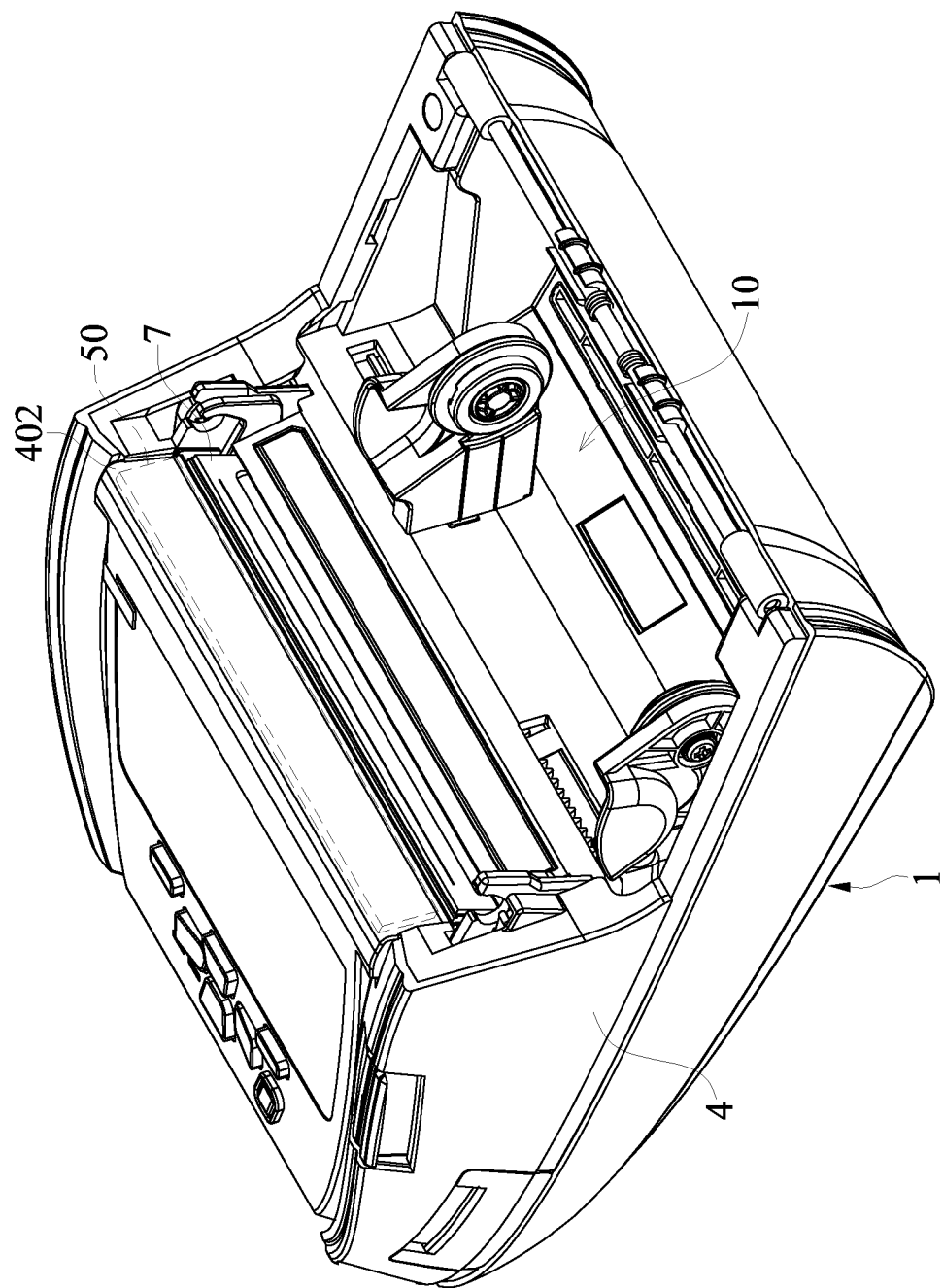
FIG. 8 is a schematic view showing the portable label printer being without a back cover unit according to the present disclosure.
Figure 9:
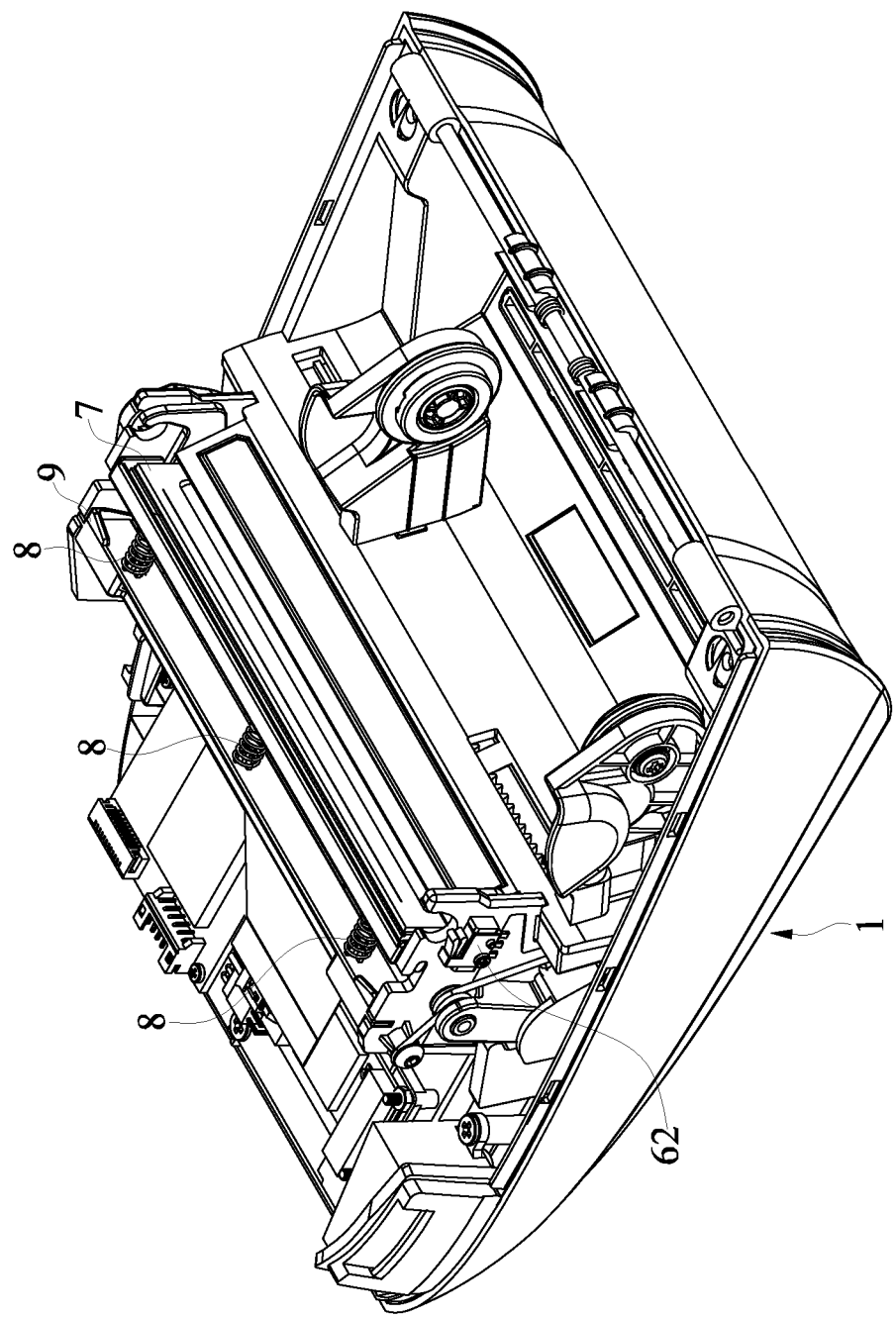
FIG. 9 and FIG. 10 are schematic views showing the portable label printer being without the front cover unit and the back cover unit from two different perspectives according to the present disclosure.
Figure 11:
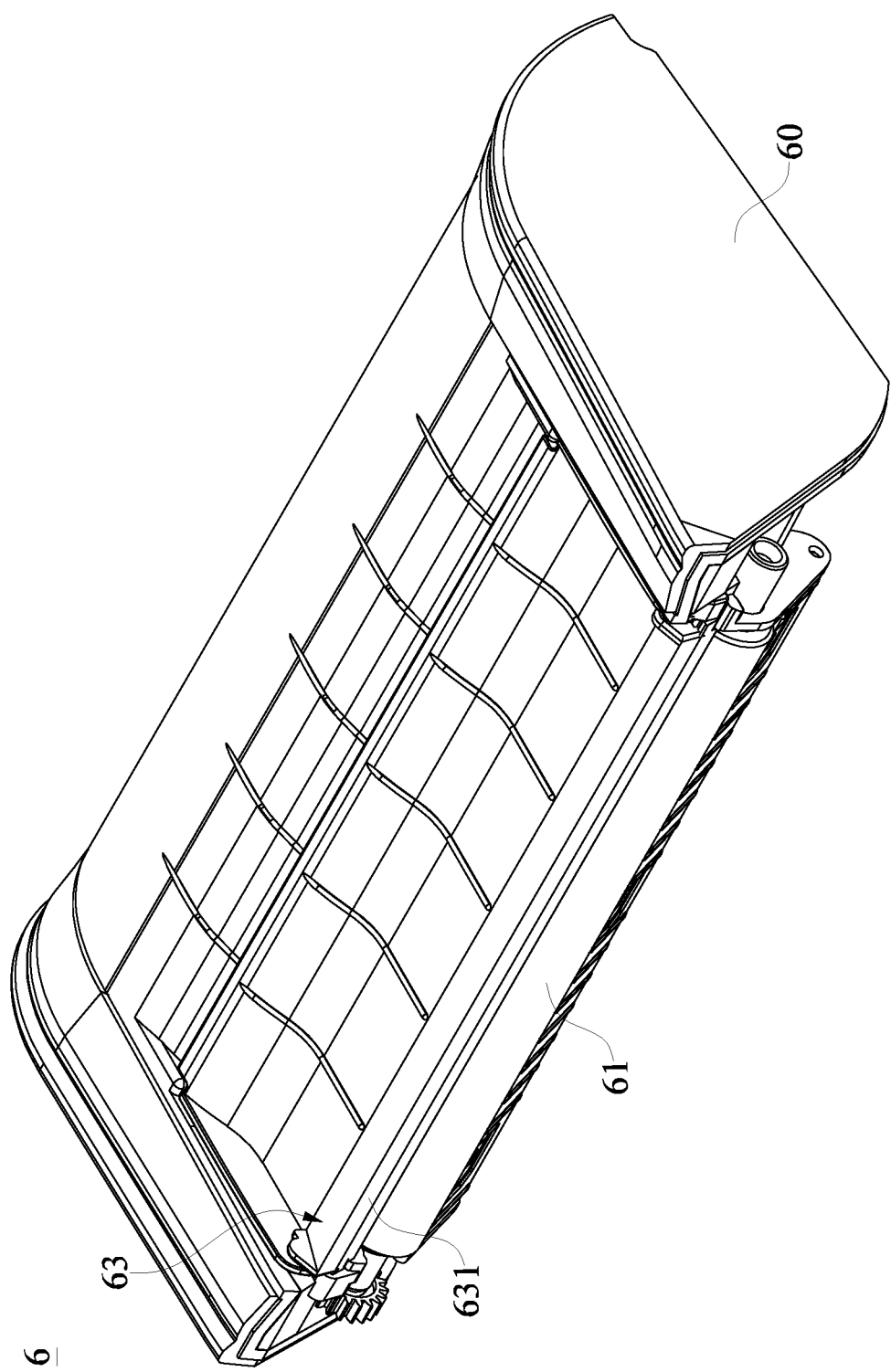
FIG. 11 is a schematic view of the back cover unit of the portable label printer according to the present disclosure.
Figure 13:
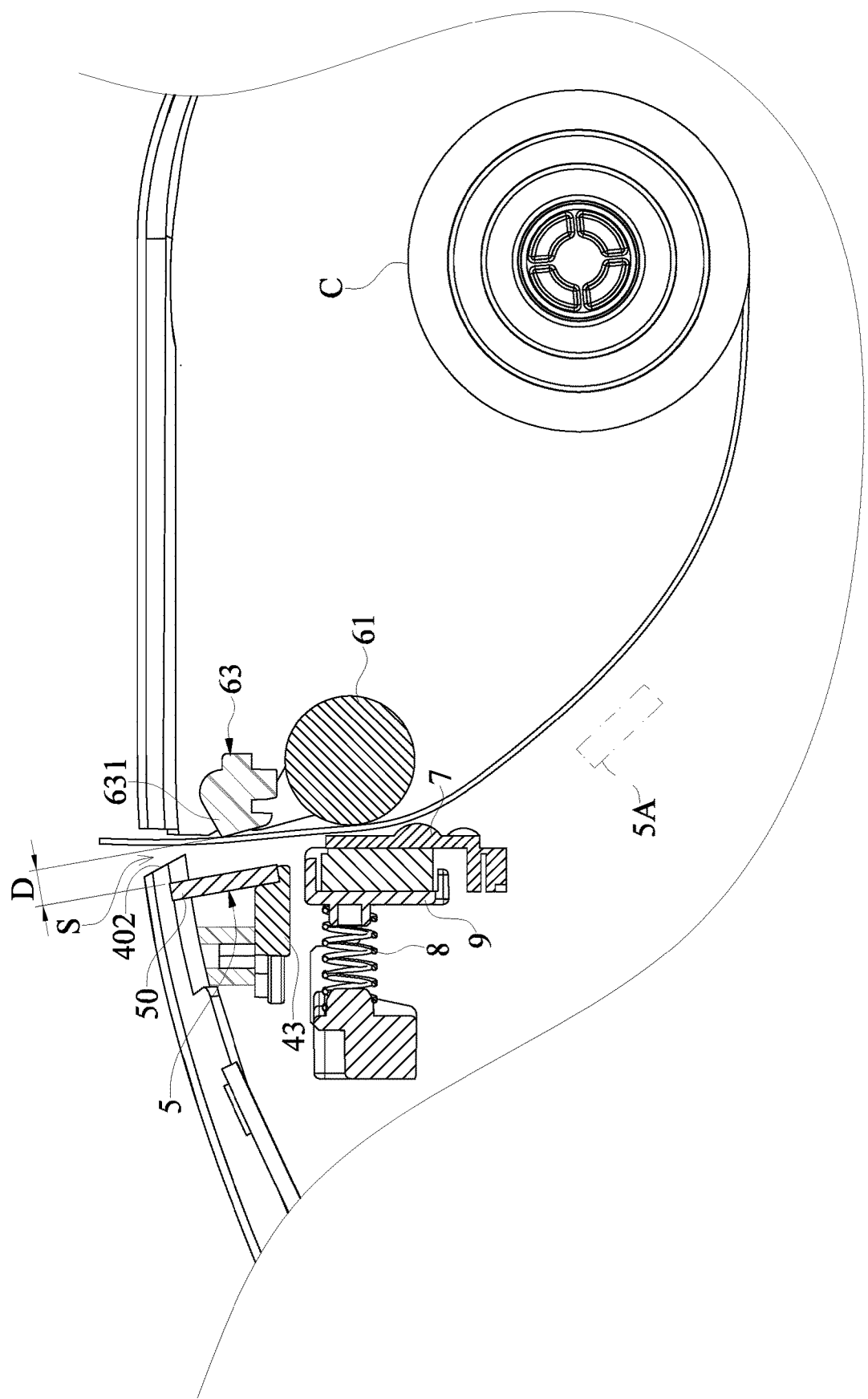
FIG. 13 is a partial sectional view of the portable label printer according to the present disclosure.

Reference is also made to FIG. 8 to FIG. 11. FIG. 8 is a schematic view showing the portable label printer being without the back cover unit according to the present disclosure. FIG. 9 and FIG. 10 are schematic views showing the portable label printer being without the front cover unit and the back cover unit from different perspectives according to the present disclosure. FIG. 11 is a schematic view of the back cover unit of the portable label printer according to the present disclosure. The print head module 7 is disposed in the main body 1 and adjacent to the paper roll compartment 10. The print head module 7 prints a content onto the surface B1 of the label B, and the print head module 7 can include a thermal print head (TPH). The RFID antenna assembly 5 is disposed in closer proximity to the paper exit port S (as shown in FIG. 2 and FIG. 13) than the print head module 7. That is to say, the RFID antenna assembly 5 is located farther away from the main body 1, and the print head module 7 is nearer to the main body 1. After the print head module 7 prints the content onto the surface B1 of the label B, the RFID processing module 3 then performs data reading and data writing on the chip B2 of the label B. Regarding actual implementation, size, and external appearance of the print head module 7, those shown in the figures are merely one of the exemplary configurations, and the present disclosure is not limited thereto. In different embodiments, the print head module 7 can cooperate with a carbon ribbon to print a content onto the surface B1 of the label B, and is not limited thereto.

In practice, the portable label printer A further includes a plurality of elastic elements 8 and a pushing element 9. An end of each of the elastic elements 8 is fixed to the main body 1, and another end of each of the elastic elements 8 is fixed to the pushing element 9. The pushing element 9 is disposed in the main body 1, and the print head module 7 is fixedly disposed at a side of the pushing element 9. In practice, when the print head module 7 and the pushing element 9 are disposed in the main body 1, the plurality of elastic elements 8 are slightly pressed by the pushing element 9. Accordingly, it is ensured that the print head module 7 abuts against the surface B1 (as shown in FIG. 12) of the label B (as shown in FIG. 12) at all times, so that the print head module 7 can correctly print a content onto the surface B1 of the label B. The quantity, size, installation position, etc., of the elastic elements 8 are not limited by those shown in the figures.

As shown in FIG. 8 to FIG. 11, the back cover unit 6 includes an insulating back cover 60, a pressing roller 61, a sensing switch 62, and a pressing member 63. The insulating back cover 60 is mainly used to shield the paper roll compartment 10, and to be fixed with the main body 1. The pressing roller 61 is rotatably pivoted to an end of the insulating back cover 60. When the back cover unit 6 and the front cover unit 4 are disposed on the main body 1, the pressing roller 61 is disposed facing the print head module 7, and the label B is held by the pressing roller 61 together with the print head module 7.

The sensing switch 62 is fixedly disposed in the main body 1 and is used to detect a position of the pressing roller 61 relative to the main body 1. In practice, the sensing switch 62 can be a micro switch. When the back cover unit 6 is fixedly disposed in the main body 1, the pressing roller 61 can correspondingly press against the micro switch. In this way, the processing module 2 can determine that the back cover unit 6 has been disposed at the correct position. At this time, the processing module 2 can control the actuation of the print head module 7 and the RFID antenna assembly 5, so as to start the printing of a content onto a surface of each label B and write specific data on the chip B2 of each label B.

Referring to FIG. 12 and FIG. 13, FIG. 12 shows the portable label printer of the present disclosure being without the back cover unit but having a label paper roll disposed therein, and FIG. 13 is a partial sectional view of the portable label printer according to the present disclosure (not all components are illustrated herein to better exhibit positional relationships of specific components). It can be clearly seen from FIG. 12 that each label B on the label paper roll C is disposed facing the print head module 7 and a limiting surface 402 of the insulating front cover 40, while the antenna substrate 50 of the RFID antenna assembly 5 inside the insulating front cover 40 is disposed facing the limiting surface 402. The limiting surface 402 guides the label B passing through the print head module 7 in an output direction. As shown in FIG. 13, in the sectional side view of the portable label printer A, the print head module 7 and the RFID antenna assembly 5 are located at a same side relative to the paper exit port S. Under this configuration, the portable label printer A of the present disclosure is capable of printing onto labels of a special label paper roll and writing data on chips of such labels. The special label paper roll refers to a label paper roll that has a metal shielding layer disposed on the inside of its release paper or on its surface. In other words, since the RFID antenna assembly 5 and the print head module 7 are disposed at the same side, the print head module 7 and the antenna substrate 50 of the RFID antenna assembly 5 are both disposed facing surfaces of the labels of the special label paper roll. As such, signals sent by the RFID antenna assembly 5 would not be shielded by the metal shielding layer of the special label paper roll.

Referring further to FIG. 11 to FIG. 13, the pressing member 63 is detachably fixed to the insulating back cover 60, and the pressing member 63 is disposed adjacent to the paper exit port S (as shown in FIG. 2 and FIG. 12). The pressing member 63 has a pressing portion 631, and the pressing portion 631 enables the label B that is arranged adjacent to the limiting surface 402 to be disposed proximate to the limiting surface 402. Through the configuration of the pressing portion 631, the label B passing through the print head module 7 can be proximate to the limiting surface 402 (i.e., being disposed nearer to the antenna substrate 50). Accordingly, the antenna substrate 50 can better perform data reading and data writing on the chip B2 of the label B. In practice, the pressing member 63 can be changed into different shapes by the relevant personnel according to a label thickness, so that the pressing portion 631 can effectively maintain the label B at a position proximate to the limiting surface 402. As shown in FIG. 13, in one embodiment, a distance D between a side surface of the antenna substrate 50 that is near the label B and an end of the pressing member 63 for pressing against the label B can be designed to be less than 4 millimeters (mm) in cooperation with thickness specifications of most labels and an overall mechanical configuration.

As shown in FIG. 13, in different embodiments, the portable label printer A further includes an auxiliary RFID antenna assembly 5A disposed in the main body 1. The print head module 7 is located between the auxiliary RFID antenna assembly 5A and the RFID antenna assembly 5. A method of operation for the portable label printer A of the present embodiment can be as follows. The processing module 2 firstly controls the actuation of the auxiliary RFID antenna assembly 5A, so that the auxiliary RFID antenna assembly 5A writes specific data on the chip B2 of the label B. Then, the print head module 7 is controlled by the processing module 2 to print a content onto the surface B1 of the label B. Finally, the processing module 2 controls the RFID antenna assembly 5 to read the data stored in the chip B2 of the label B, so as to confirm that the data in the label B has been written correctly.

In conclusion, the portable label printer of the present disclosure can not only print a specific content onto a surface of a label, but is also capable of writing data on a chip of the label. In this way, different from the conventional label printer, the relevant personnel would not need to firstly use the label printer to print the specific content onto the surface of the label, and then use another device to write specific data on the chip of each label one by one.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A portable label printer, used for printing a content onto a surface of a label that has a chip disposed therein, the portable label printer comprising:
   a main body including a processing module and a radio frequency identification (RFID) processing module, wherein the processing module is electrically connected to the RFID processing module, and the main body includes a paper roll compartment;
   at least one RFID antenna assembly electrically connected to the RFID processing module, wherein the at least one RFID antenna assembly performs data reading and data writing on the chip of the label;
   a front cover unit disposed at a front end of the main body and including an insulating front cover and an insulating limiting assembly, wherein an inner side of the insulating front cover has a first limiting structure, the insulating limiting assembly has a second limiting structure, the insulating limiting assembly is detachably disposed at the inner side of the insulating front cover, and the RFID antenna assembly is fixedly disposed at the inner side of the insulating front cover by cooperation of the first limiting structure and the second limiting structure;
   a back cover unit movably disposed at a back end of the main body, wherein a paper exit port is formed between the front cover unit and the back cover unit; and
   a print head module disposed in the main body and adjacent to the paper roll compartment, wherein the print head module prints the content onto the surface of the label, and the RFID antenna assembly is disposed in closer proximity to the paper exit port than the print head module.

2. The portable label printer according to claim 1, wherein a plurality of first fixing structures are provided at the inner side of the insulating front cover, the insulating limiting assembly includes an insulating bottom plate and a plurality of insulating fixing members, the insulating bottom plate includes a plurality of second fixing structures and the second limiting structure, and the insulating bottom plate is fixed at the inner side of the insulating front cover by cooperation of the plurality of insulating fixing members, the plurality of second fixing structures, and the plurality of first fixing structures.

3. The portable label printer according to claim 1, wherein the RFID antenna assembly includes an antenna substrate, an antenna structure is formed on a surface of the antenna substrate, and an included angle between the surface of the antenna substrate and a horizontal plane ranges from 65 to 90 degrees.

4. The portable label printer according to claim 1, wherein the RFID antenna assembly includes an antenna substrate, and an antenna structure is formed on a surface of the antenna substrate; wherein the insulating front cover has a first inclined abutment surface formed inside thereof, the second limiting structure has a second inclined abutment surface, the first inclined abutment surface and the second inclined abutment surface are parallel with each other, the surface of the antenna substrate abuts against the first inclined abutment surface, and another surface of the antenna substrate abuts against the second inclined abutment surface.

5. The portable label printer according to claim 4, wherein the insulating front cover has a limiting surface, the limiting surface is parallel to the first inclined abutment surface, the limiting surface is disposed adjacent to the paper exit port, and the limiting surface guides the label passing through the print head module in an output direction.

6. The portable label printer according to claim 5, wherein the back cover unit further includes an insulating back cover and a pressing member, the insulating back cover shields the paper roll compartment, and the insulating back cover is connected to the main body; wherein the pressing member is detachably fixed to the insulating back cover, and the pressing member is disposed adjacent to the paper exit port; wherein the pressing member has a pressing portion, and the pressing portion enables the label that is arranged adjacent to the limiting surface to be disposed proximate to the limiting surface.

7. The portable label printer according to claim 6, wherein the portable label printer further includes a plurality of elastic elements and a pushing element, an end of each of the plurality of elastic elements is fixed to the main body, another end of each of the plurality of elastic elements is fixed to the pushing element, and the print head module is fixedly disposed at a side of the pushing element; wherein the back cover unit further includes a pressing roller and a sensing switch, the pressing roller presses against a side of the print head module, the sensing switch is fixedly disposed in the main body, and the sensing switch detects a position of the pressing roller relative to the main body.

8. The portable label printer according to claim 1, wherein the RFID antenna assembly includes an antenna substrate, at least one electrical connection wire, and at least one electrical connection plug, an antenna structure is formed on a surface of the antenna substrate, one end of the at least one electrical connection wire is fixed to the antenna substrate, the electrical connection plug is disposed at another end of the at least one electrical connection wire, and the electrical connection plug is pluggably inserted into a socket of a circuit board of the RFID processing module; wherein the RFID processing module has a voltage adapter board, the circuit board of the RFID processing module and the voltage adapter board are connected with each other, the voltage adapter board is connected to a main circuit board of the processing module, and the voltage adapter board converts power supplied by a battery of the portable label printer through the processing module into a voltage that is required for operation of an RFID processor of the RFID processing module.

9. The portable label printer according to claim 1, further comprising an auxiliary RFID antenna assembly disposed in the main body, wherein the print head module is located between the auxiliary RFID antenna assembly and the RFID antenna assembly, the auxiliary RFID antenna assembly writes data on the chip of the label, and the RFID antenna assembly reads the data stored in the chip of the label.

10. The portable label printer according to claim 1, wherein the print head module and the RFID antenna assembly are located at a same side relative to the paper exit port.

\* \* \* \* \*